United States Patent [19]

Wieneke

[11] Patent Number: 5,027,592
[45] Date of Patent: Jul. 2, 1991

[54] ROLLER-TYPE MOWER

[76] Inventor: Franz Wieneke, August-Lange-Str. 14, D-3406 Bovenden, Fed. Rep. of Germany

[21] Appl. No.: 427,854
[22] PCT Filed: Feb. 8, 1989
[86] PCT No.: PCT/DE89/00077
§ 371 Date: Oct. 6, 1989
§ 102(e) Date: Oct. 6, 1989
[87] PCT Pub. No.: WO89/06898
PCT Pub. Date: Aug. 10, 1989

[30] Foreign Application Priority Data

Feb. 8, 1988 [DE] Fed. Rep. of Germany ....... 3803725
Jun. 6, 1988 [DE] Fed. Rep. of Germany ....... 3819227
Jun. 30, 1988 [DE] Fed. Rep. of Germany ....... 3822161

[51] Int. Cl.$^5$ .............................................. A01D 34/53
[52] U.S. Cl. ........................................ 56/249; 56/291; 56/294; 56/DIG. 20
[58] Field of Search ................ 56/291, 249, 250, 252, 56/293, 294, 17.3, DIG. 9, DIG. 17, DIG. 20, 12.9, 13.1, 14.3, 14.4

[56] References Cited

U.S. PATENT DOCUMENTS

| | | | |
|---|---|---|---|
| 2,299,384 | 10/1942 | Day | 56/249 |
| 2,904,118 | 9/1959 | Simpson | 172/599 |
| 3,029,583 | 4/1962 | Patt | 56/294 |
| 3,073,100 | 1/1963 | Kingsley | 56/294 |
| 4,109,447 | 8/1978 | Ferguson | 56/13.3 |
| 4,550,554 | 11/1985 | Lundahl et al. | 56/294 |
| 4,719,743 | 1/1988 | Bokon | 56/294 |
| 4,920,737 | 5/1990 | Wieneke | 56/294 |

FOREIGN PATENT DOCUMENTS

| | | |
|---|---|---|
| 0085193 | 2/1896 | Fed. Rep. of Germany . |
| 1147794 | 4/1963 | Fed. Rep. of Germany . |
| 1757631 | 5/1971 | Fed. Rep. of Germany . |
| 3635925 | 4/1988 | Fed. Rep. of Germany . |
| 6515224 | 5/1967 | Netherlands . |
| 0742595 | 12/1955 | United Kingdom . |

Primary Examiner—Terry Lee Melius
Attorney, Agent, or Firm—Evenson, Wands, Edwards, Lenahan & McKeown

[57] ABSTRACT

A roller-type mower with a rotatable drum or roller is provided with cutting members on its surface which rotate at a speed required for free cutting. The mower is distinguished by the fact that a plurality of separate cutting members are provided on its surface. Each is obliquely pitched relative to the axis of rotation, or is helically designed, and the mutually spaced cutting members overlap each other in the direction of travel.

35 Claims, 15 Drawing Sheets

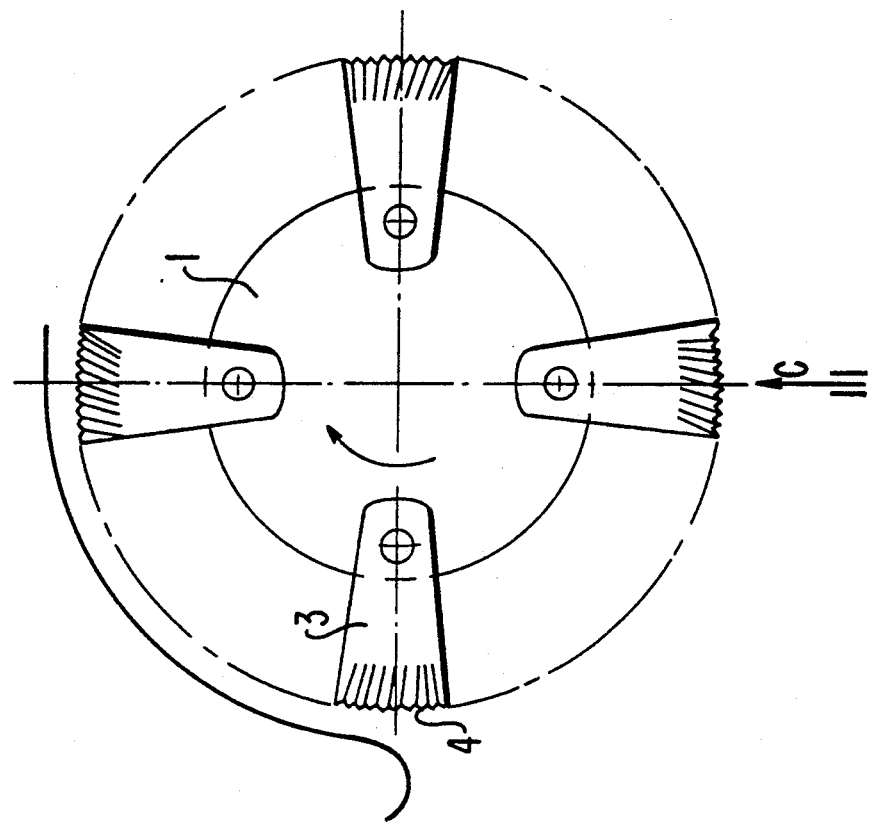
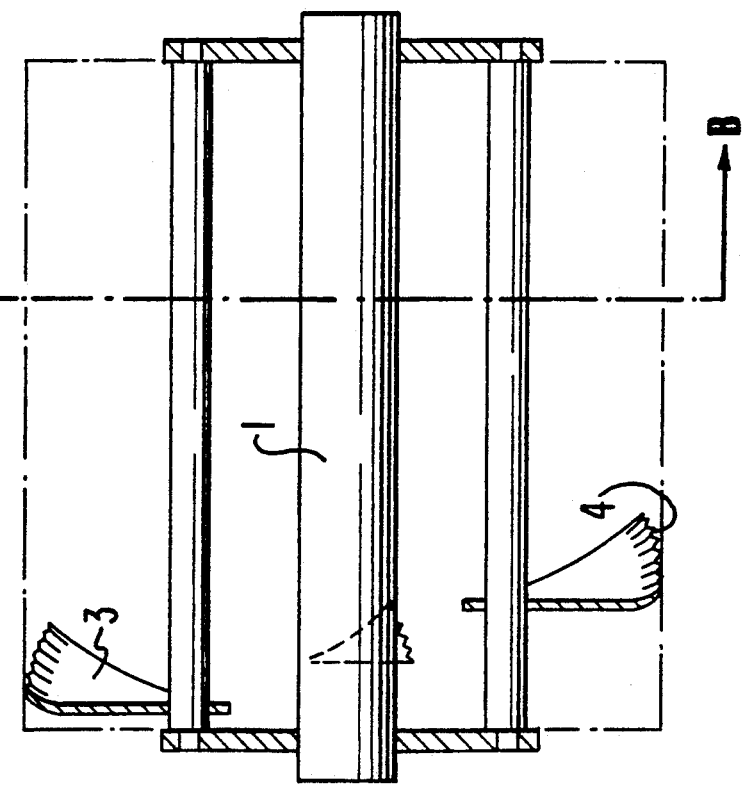

ROLLER-TYPE MOWER

BACKGROUND AND SUMMARY OF THE INVENTION

The present invention relates to a roller-type mower provided with a rotatable drum or roller with surface cutting members, or one continuous helical cutting blade, provided for rotation at a speed required for unrestricted cutting.

Roller-type mowers of the above-described type are used as attachment-type mowers for tractors or as auto-travelling or manually pushed mowers for gardens, golf lawns, fields, or the like.

The known roller-type mowers entail a couple of disadvantages which will be described in the following:

It is commonly known that in mowing devices rotating about a horizontal axis, the percentage of uncut or incompletely cut grass blades increases initially only slightly but later on to a much higher degree as the angle of inclination between the cutting blade and the axis of rotation becomes larger. FIG. 15 illustrates an example of this fact wherein the interrelationship between the cutting energy required for cutting and the angle of inclination $\alpha$ of the cutter blade is illustrated. A major reduction of the cut quality will arise with a blunt cutting blade at a comparatively small angle of inclination of some 30°.

The reason why a helical mower with a slight inclination $\alpha$ of the helical smooth cutting blade (and thus with a wide angle of inclination) will fail to produce clean cuts is that the helix pushes the stalks to be mowed to the side rather than cutting them.

FIG. 15 moreover illustrates that with the angle of inclination $\alpha$ increasing, the required cutting energy is first reduced, which means that a dragging cut with lower power consumption will arise.

A mowing helix with a great inclination operates on a smaller angle of inclination $\alpha$, which may be compared to a beating mower or a beating chopper for field application. Here the beaters hit the stalks approximately at right angles to beat them off. In accordance with the cycloidal mowing path, which is the more cycloidal the higher the travelling speed, the upright stalks are beaten off in comma-shaped sections $a_1, a_2; \ldots$ (see FIG. 17). The motion of beating the upright stalks from the top to the bottom continues in accordance with the cycloidal paths of the mowing tools, becoming more and more effective, until the stubble height is reached. The stalks are thus cut into multiple pieces over their length, with pieces being so reduced in length that they drop into the stubbles and can no longer be picked up. The multiple severing of the upright stalks also requires an appropriate power supply. When the mowed material is not ejected directly to the rear end, but rather against the stalks still standing, the stalks will also be shortened. Then a stock of mowed material will be formed ahead of the rotor, which the mowing helix partly cuts off and removes even though it increases the volume of the freshly mowed material. The roller-type stock of material ahead of the cutting rotor may also press the fine blades of grass, or beets to be mowed, to such an extent that it will then be seized by the mowing tools only partly. This results in an undesirable stubble height.

In accordance with the foregoing explanation, the power consumption and unfortunately the quality of cut (uniform stubble height) is impaired by a smooth cutting blade with a decreasing inclination of the helix.

With a serrated helix, the inclination of the cutting tooth flank is theoretically decisive for the quality of cut and the power consumption, as well as for the reduction of the natural length of the stalks. The inclination of the helix, however, is relevant also for swath formation, or generally for the axial transport of the mowed material through the mowing helix itself. As can be taken from the laid-open German Patent Application DE 36 35 925 A1, (which corresponds to U.S. Ser. No. 221,255 filed June 22, 1988), the angle of inclination of the mowing helix must not exceed the tangent of the frictional angle of the mowed material (sliding condition).

There is also the particular disadvantage that the cutting blades of roller-type mowers, which extend continuously over the mowing width, become blunt within a relatively short time as stones slide along these blades. The stones are obviously not passed through to the rear end quickly enough. Serrated cutting blades, which provide for a cleaner cut than do smooth cutting blades, are prone to bend whenever stones hit them. As has been set out above, cut leaves and blades may easily get stuck between the teeth.

At a marginal zone of the cutting members, which is inclined to the axis of rotation, it is easily possible that clots of soil will adhere there and reduce the cutting ability.

The present invention is based on the problem of designing the cutting blades of roller in such a way that foreign matter will be easily passed through the cutting blades. This results in long service life, the blades will remain well sharpened for a long time and the adherence of clots of soil will be avoided. Whenever possible, a slight regrinding effect should be achievable on the cutting members in the machine. According to the present invention, with a helical mower with a serrated cutting blade, the reduction of the natural length of the stalks or blades during mowing should be kept as small as possible while providing for clean stubble cutting.

According to the present invention, known cutting blades, which rotate on the surface at a low or even a major inclination, are segmented so as to allow for the passage of foreign matter such as stones, etc. At the same time, the cutting blades are staggered in the direction of rotation, while the cutting segments themselves are intermeshed in a specific geometrical arrangement. To this end, a plurality of separate cutting members is provided on the surface. Each member is pitched at an angle from the axis of rotation, or is of a helical design. Moreover the mutually spaced cutting members overlap each other in the direction of travel. Shorter segmented and mutually staggered helical segments provide for better passage of foreign matter.

A better cutting result, i.e. neatly cut stubbles with a minimum reduction of the natural length of the stalks or blades, will be achieved in accordance with the present invention due to the fact that in a serrated cutting edge, the helix is designed with an inclination so high that it will initially bend the upper portions of the stalks to the side and will then sever the stalks at the designed stubble height with the inclined tooth flanks in the lower section. The angle of inclination of the tooth flanks is so selected that the stalks may not slip off the cutting blade at the stubble height. According to the present invention, this is achieved by having the angle of inclination ($\alpha$) of the obliquely or helically pitched cutting members smaller than 30° and the angle of inclination ($\beta$) of the flanks effective for cutting in the forward direction greater than 20°, while the angle of inclination $\Gamma'$ of the cutting blade, relative to the axis, exceeds 60°.

It was a surprise to find that a mowing helix with a serration and a small inclination angle $\alpha$ of the helix, whose effective lines of cut are inclined only at a small angle $\beta$ and which does not provide for a lateral deviation of the stalks will not result in beat-off of the upper stalk segment. In such a case, the tooth tips obviously have the effect of a quasi-continuous cutting blade at the outer periphery of the helix, which permits the passage of the stalks in the upper stalk section with a relatively small bending resistance, but prevents them from entering the tooth gaps. Only in the region close to the ground will this happen with the increasing bending resistance, so that the cut may be performed. The angle of inclination $\alpha$ of the helix, which is to be selected accordingly, and the angle of inclination $\beta$ of the cutting tooth flank are determined by the properties of the material to be mowed.

As far as stalk material is concerned, it may be stated that the angle of inclination $\alpha$ of a helix with a serrated cutting blade, must be below the frictional angle $\mu$. With a frictional value of $\mu=0.5$ for fresh material, a frictional angle below 30° will arise. This ensures an axial transport of the mowed material, which is required for swath formation. The angle of inclination $\beta$ of the effective tooth flanks should then exceed 20° so as to ensure that leaves and stalk fibers will not get caught and that the teeth will retain their cutting ability.

Depending on the nature of the material to be cut, and on the environment in which the material is to be cut, these inventive features may either be combined with each other, or applied separately. It is possible, for instance, to provide cutting members on a drum that are separated from each other and pitched at a angle relative to their axis of rotation and with a cutting blade designed as a continuous helix which is pitched less than 30° and inclined with respect to the flanks of the cutting blades at an angle greater than 20° and wherein the angle of the cutting blade with respect to the rotary axis of the mower exceeds 60°. With meadows full of stones, the specific helix design is not necessary. However, when the mower is to be used on a soil including only a small number of stones, such as on the green of golf courses, the continuous helix described above is desirable.

Provisions are also made to the effect that the marginal zone of the continuous cutting blade, or of the individual cutting members, will enclose an angle with the axis of rotation of the mower.

Moreover, the individual cutting segments may be suspended to oscillate so that the mower is suitable for application on very stony meadows.

An improved passage of stones will be achieved when the cutting members are disks, pitched obliquely with respect to the direction of travel and wherein the rims of these disks are designed as cutting edges.

The service life of the cutting edge with a good quality of cut will be improved by providing a specific undulation of the cutting blade. A serration can be embossed or cut into the outer marginal zone of a helical segment or the rim of a disk. The effective line of cut of the individual tooth is inclined relative to the axis of rotation so that stalks or leaves may not get stuck. Relative to the peripheral direction, the tooth is pointed, which results in an unproblematic and clean cut. The combination of individual teeth contributes to a long service life.

An improvement which prevents the necessity for multiple cutting is obtained by having a light apron disposed near and ahead of the helical rotor, which apron is made to lie on the material to be cut, and bends the material in the direction of travel as well as preventing the mowed material from being ejected in a forward direction. In mowing technology, deep-reaching fixed metal sheet projections or rollers are known which bend the material still to be cut in the forward direction. They do not conform to the density of the stalks or blades of material to be cut, so that the mowed blades must be torn through and out of the mowing tools under the deposit areas of these bend-down elements. Such arrangements result in a partial second cut of the stalks and blades already mowed. The known protective cloths in drum- and disk-type mowers fail to produce this effect, since the multiple cut problem is not involved in such mowing principles. An active transport of the mowed material out of the cutting region can be achieved by a driven roller which is disposed directly ahead of the helical rotor.

Longitudinal bars may be disposed on the drum or the roller of the helical mower so as to promote the rapid material transport. Moreover, provisions have been made to achieve a detachment of the mowed material in the front region of the mowing drum by use of a hood beginning to rise ahead of the center of the helical mower. A slight sector of contact with the mowing helix reduces the danger of multiple cutting. The hood adds the possibility of a turning effect for the material by the hood dome so that the stream of cut stalks will be deposited on the ground either with the stalk ends on the top, or in an irregular bunch, so that the cut material will dry more rapidly.

Specifically when home greens or golf courses are to be mowed or where a very clean and a maximum smooth cut is desirable, it is recommended to operate with ground cutting blades which, in their turn, provide for a rather low inclination of the helix. Because of this, the cutting blade of the helix should be easily replaceable. Such is accomplished wherein the cutting blade is band-shaped and so attached onto a helical supporting body that it will fully rest upon the latter. This cutting band typically includes an angle of $\Gamma'\simeq 60°$ so that soil clots and stalk or blade residues may not accumulate. When removed and spread, this band thus constitutes a circular ring, or a segment thereof, whose radii are defined by the inclination of the helix.

A helical supporting body which carries the band is Provided with a stripshaped surface on which the band may rest. When a straight elastic strip of band with the same pitch is wound onto a cylinder it will "fully rest" on the side, i.e. without any gap. In this design, the band rests on a collar so that it is suitable to absorb the axial component of the cutting force.

Towards the cutting side, the helical bar of the supporting body which carries the band, is pitched at some 60° relative to the axis of rotation such that segments of stalks, blades and leaves as well as soil clots may slip off.

With a serrated cutting edge of the band, the inclined helical bar opens at the root of the teeth so that only the teeth are projecting. The teeth may be slightly raised by 20° from a paraxial line so that the teeth themselves may be ground or trued according to the generally known grinding method by a sharpening stone being moved to and fro with the rotor running.

It is also possible, of course, with a different design of the cutting members, to grind the cutting blade with the rotor running by feeding a grinding bar (corundum bar) or stone moved to and fro across the blade.

Other objects, advantages and novel features of the present invention will become apparent from the following detailed description of the invention when considered in conjunction with the accompanying drawings.

BRIEF DESCRIPTION OF THE DRAWINGS

FIG. 2 is a lateral view of another roller-type mower with cutting tools suspended to oscillate;

FIG. 3 is a sectional view taken along A-B in FIG. 2;

DETAILED DESCRIPTION OF THE DRAWINGS

Figure 1:
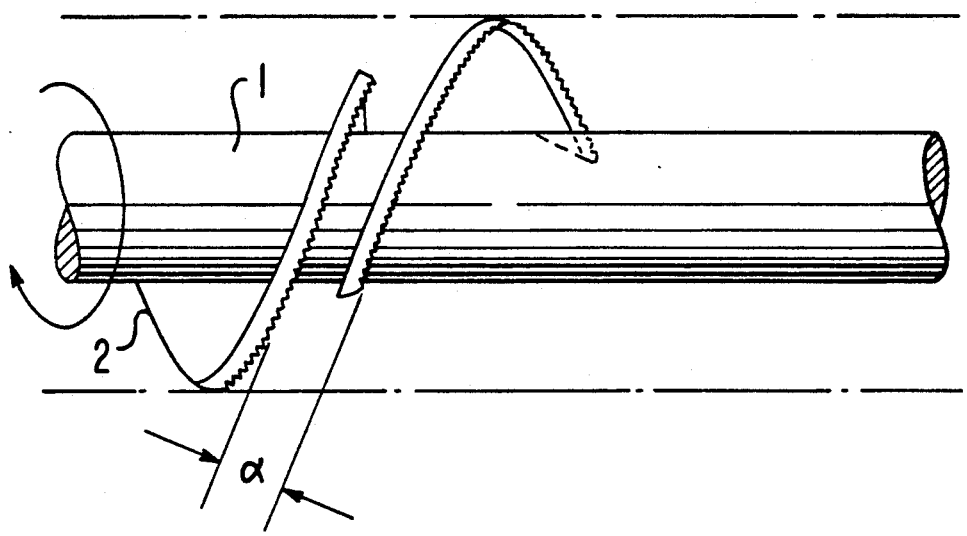
FIG. 1 illustrates a first embodiment of the present invention, wherein a plurality of separate cutting members is provided.

In the following description the same reference numerals relate always to the same elements so that, whenever applicable, a repeated presentation of elements already described may be omitted.

FIG. 1 is a side view of a roller-type mower according to the present invention, which includes helical cutting members 2 on a shaft, or on a casing 1. There is a gap (a) between the individual cutting members 2, which overlap each other in the direction of travel. Stones or gravel may pass through the gap without a long lateral transport ahead of the cutting blade.

Figure 4:
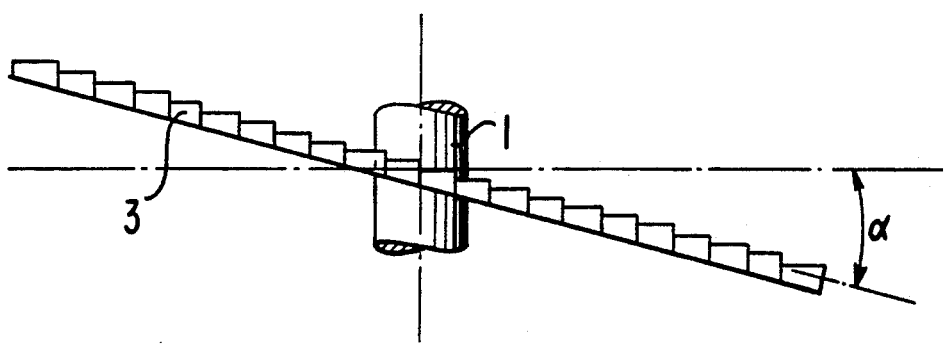
FIG. 4 is a view in the direction of arrow C in FIG. 3.

FIGS. 2 to 4 show another embodiment of a roller-type mower which includes a roller type 1 with helical cutting members 3 suspended to oscillate and whose external cutting zone 4 is serrated and inclined at an angle $\alpha$ relative to the orientation of the axis. The angle of inclination $\alpha$ of these cutting members is expediently selected so that the mowed material slips off the inclined element 3 and is thus axially transported. This arrangement provides for a mowing swath formation when the inclination of the cutting members is oriented from both sides to the center.

Figure 5:
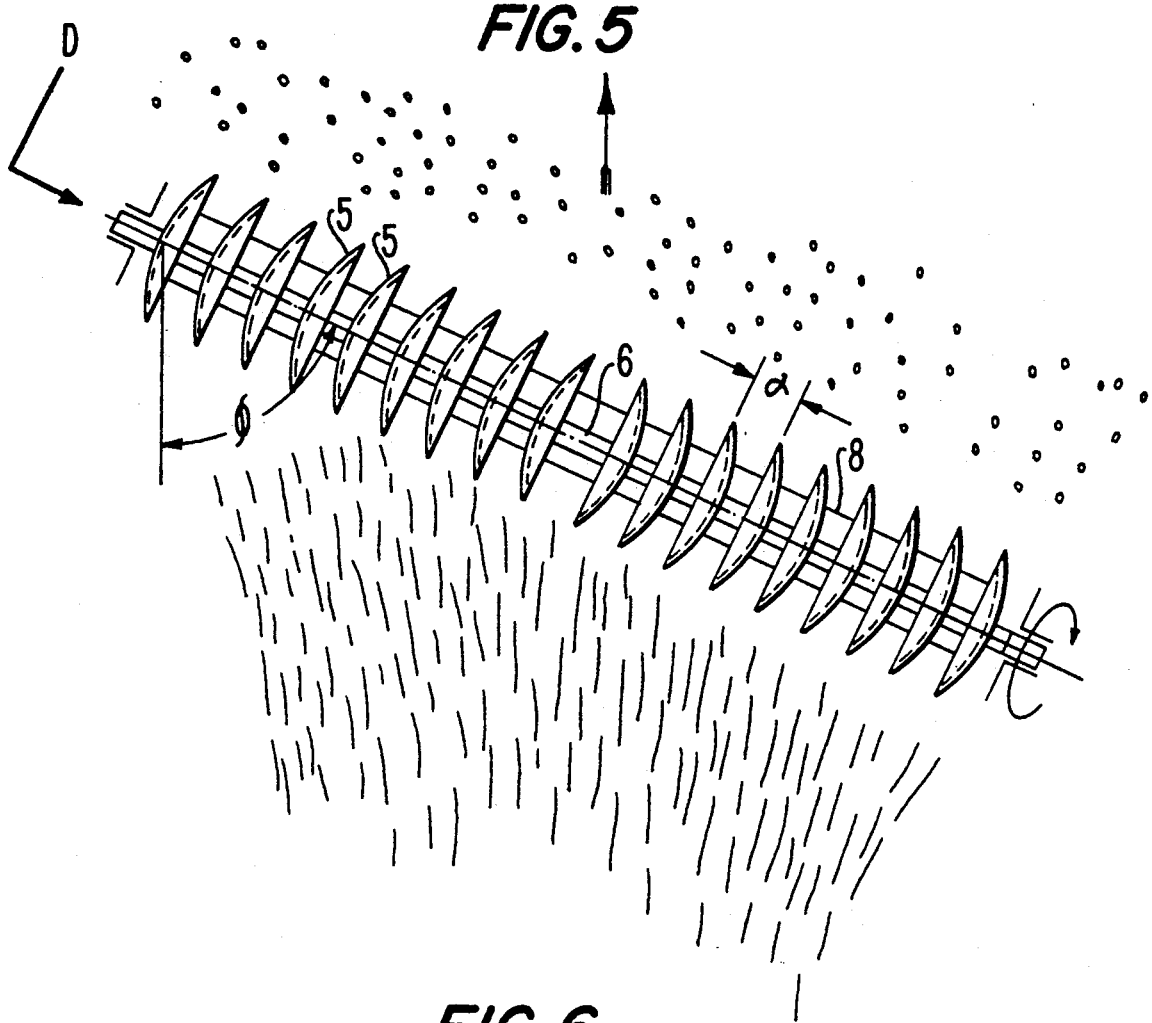
FIG. 5 is a lateral view of an embodiment wherein the cutting members are constituted by disks.
Figure 6:
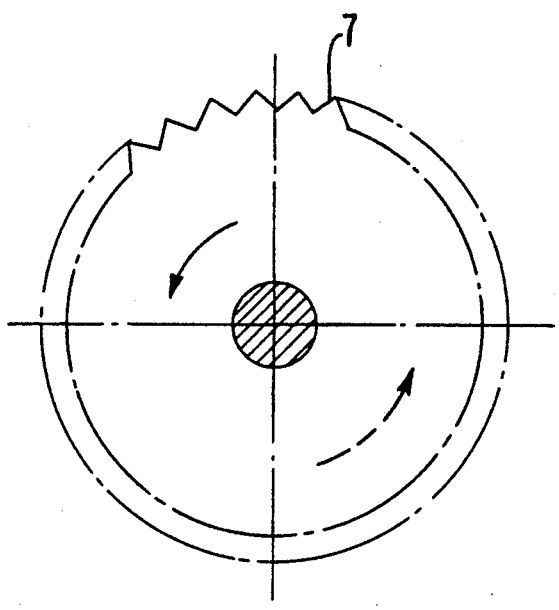
FIG. 6 is a view in the direction of arrow D in FIG. 5.

FIGS. 5 and 6 illustrate another embodiment of the present invention wherein the cutting members are disks 5 which are accommodated on a shaft 6. The axis of rotation of the shaft 6 is pitched at an angle $\phi$ relative to the direction of travel. The rim of the disks is smooth and cambered or is provided with a serration 7 (see FIG. 6) which may be cut-in or embossed. Such a cutting rotor may mow in an undershot or an overshot fashion. It is expedient to fill the space between the disks with tubular sections 8 of such a diameter that their periphery approximately corresponds to the mean stalk length of the material to be cut. In this way a coiling onto the rotor will be largely avoided.

Figure 7:
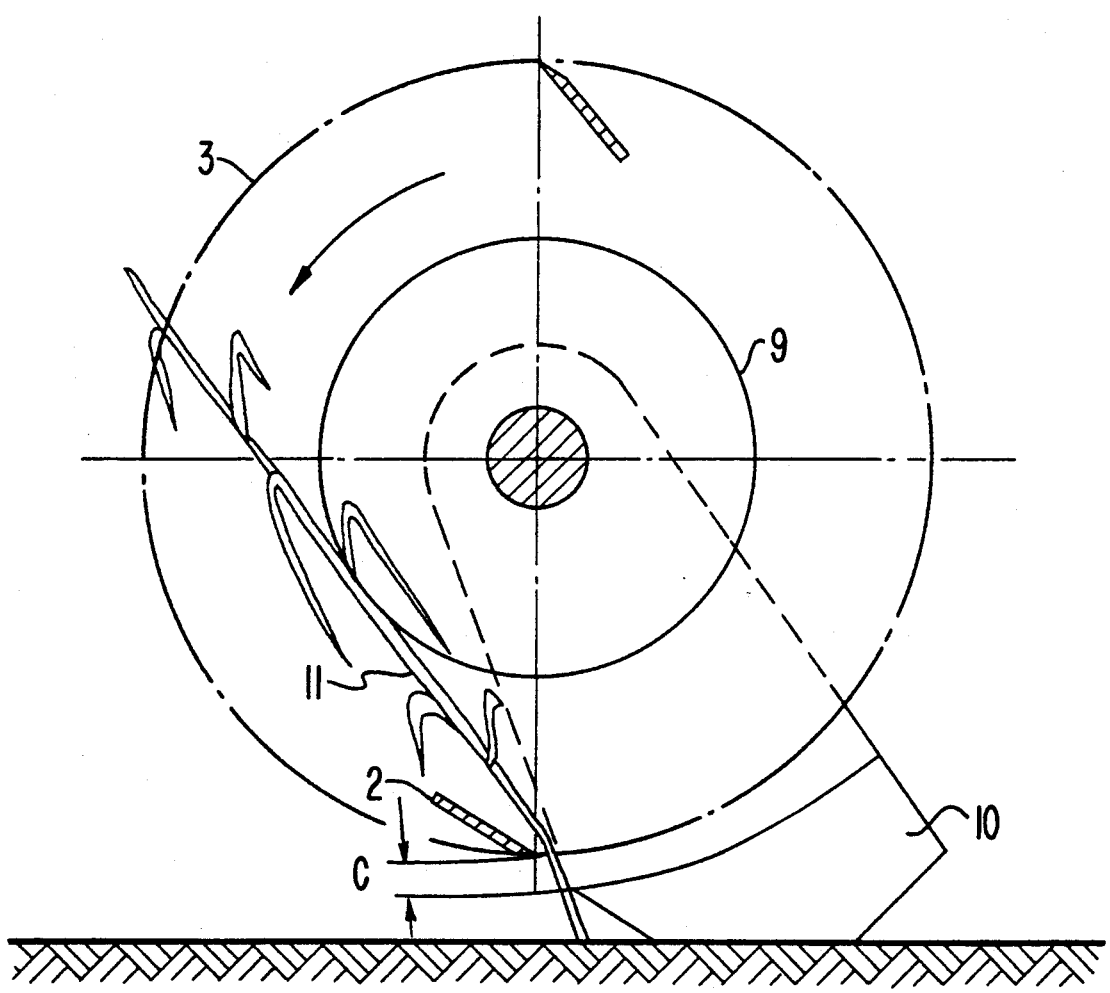
FIG. 7 shows an embodiment wherein the mower includes a support.

FIG. 7 illustrates an embodiment wherein the mowing rotor, which is globally indicated only by the cutting circle 9, is supported from the ground by a guide bar 10. In the event of undershot mowing, the front tip of the guide bar 10 extends into the area of the center of the axis so that its continuous front edge will support the stalk on grass blade 11 which the rotor beats off in a free cutting motion at a spacing (c).

Figure 8:
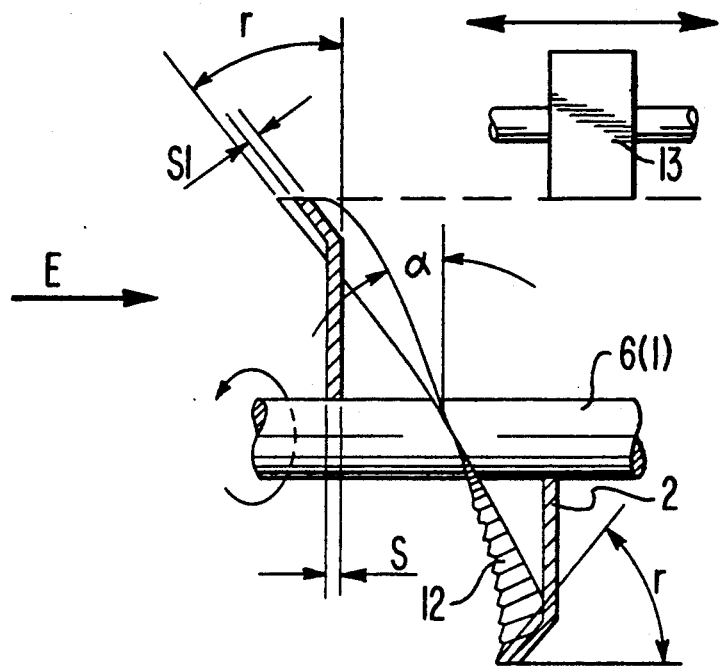
FIGS. 8 to 10 illustrate various views of a tooth profile of the cutting blades.
Figure 9:
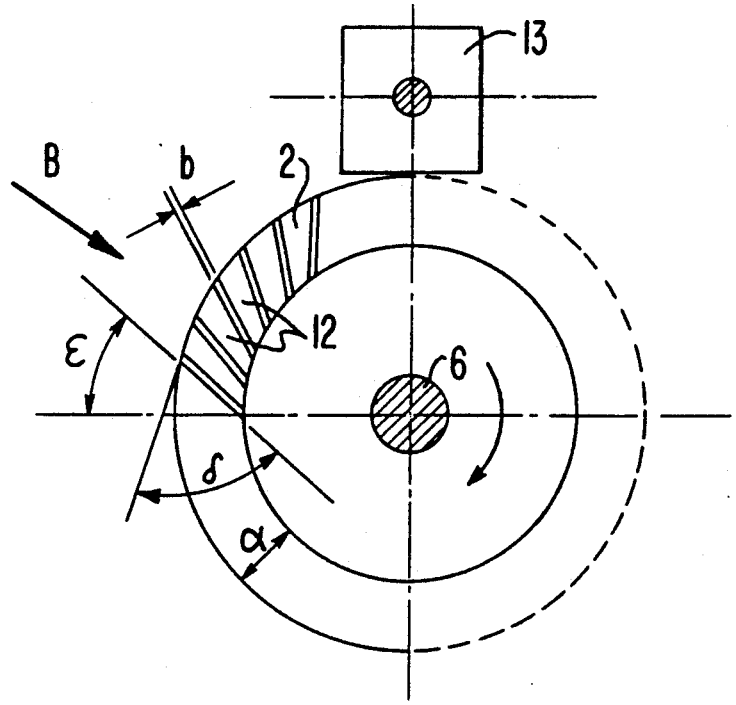
Figure 10:
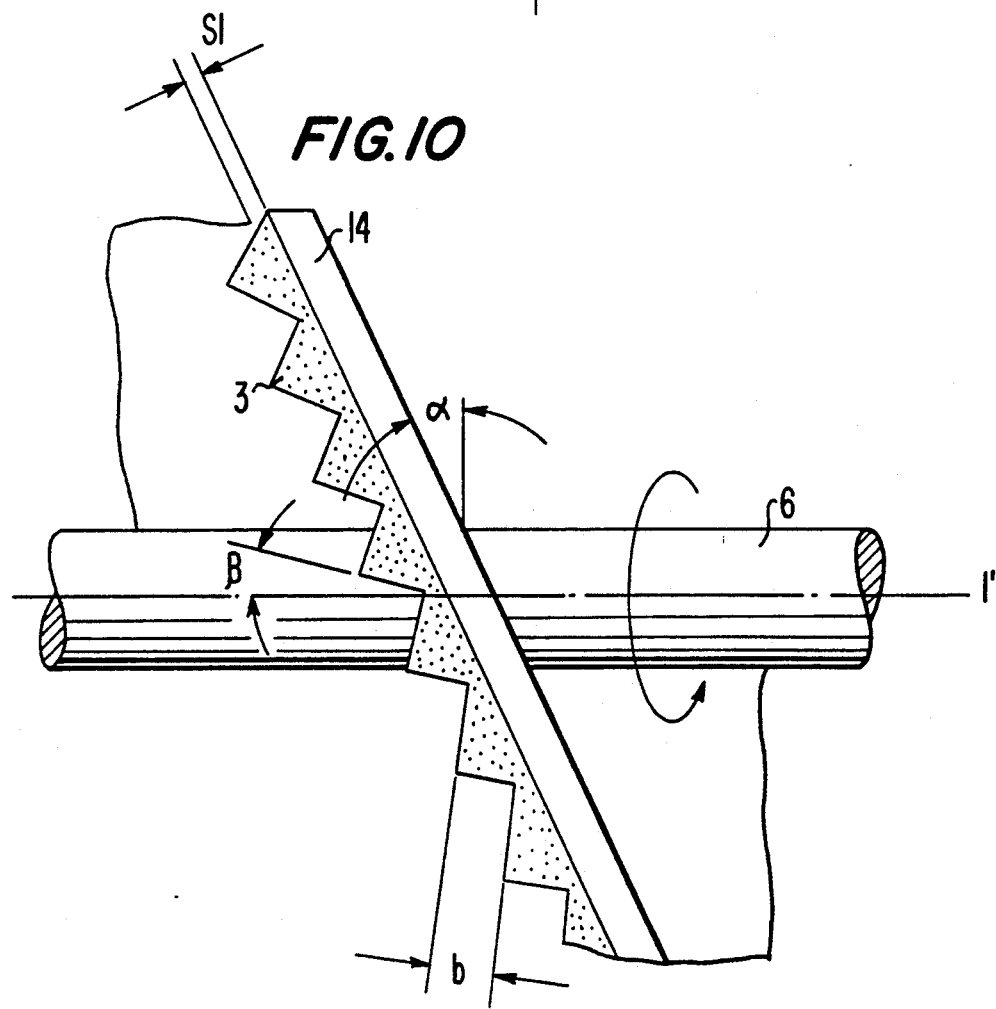

FIG. 8 is a front view, FIG. 9 a view in the direction of the Arrow E in FIG. 8 and FIG. 10 an enlarged view of an expedient tooth profile of the cutting blades. This profile provides a long service life of the cutting edges with the easy grinding of the blades in the machine.

FIG. 8 shows half of a helical cutting member 2 at an angle of inclination $\alpha$ relative to the shaft 1. The marginal zone (a) of the helix is inclined at an angle $\Gamma$ relative to the normal on the shaft 6 or roller 1. The angle $\Gamma$ is roughly 30° and so small that soil clots will radially slip off and cannot accumulate. The helical element 3 is a metal sheet of gauge (s). A corrugation 12 is so cut or embossed into the marginal zone (a), that a metal sheet gauge (s) of the marginal zone (a) will be retained all through the element so as to enhance its rigidity. The corrugation is preferably inclined at an angle $\epsilon$ (FIG. 9) relative to a radial orientation of travel, and at an angle $\beta$ relative to the axis 6 (see FIG. 10) so that the mowed material may slip off at the sides. This results in a cutting angle $\delta$ of the width of the active outside cutting line (b) of the individual tooth 12 which is smaller than 90°. The wider one selects for angle $\epsilon$, the smaller is the angle $\delta$. The individual tooth will thus become more acute which is desirable when fine leaves are to be mowed. With $\epsilon = 0°$, $\delta$ takes the value 90° provided that the angle $\beta$ remains small. In this case, the tooth is less sensitive to hitting stones, but on the other hand it is less sharp.

Provisions have been made for a vapor-deposited nitrate coating, or case-hardening, of the corrugated area. This will result in a more rapid wear of the softer area of the outside surface while a self-grinding effect is achieved for the teeth.

Optionally, a sharpening stone 13 or the application of a corundum bar may be provided for regrinding. The outside surface 14 of the blade (marked as a darker area in FIG. 10) is removed while the shape of the tooth is retained. The outside surface 14 of the cutting segment 3 thus represents part of the surface of a roller which is removed by grinding.

Figure 11:
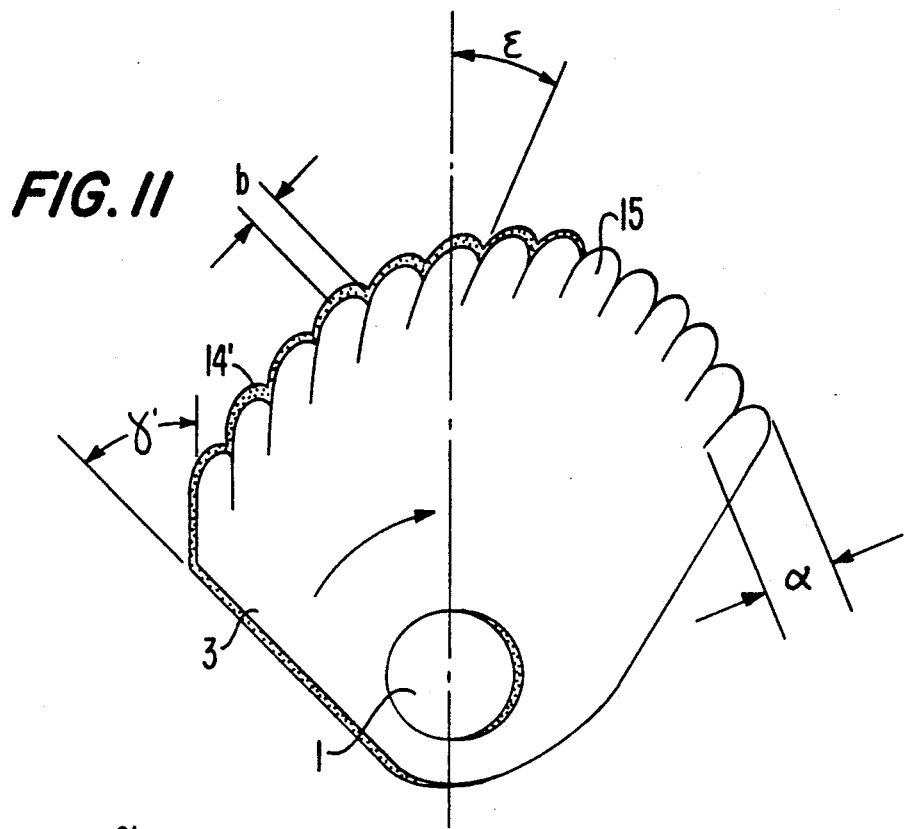
FIG. 11 shows another embodiment of the tooth profiles.

An undulated profile 15, as shown in FIG. 11, is an alternative of the serration of the inclined marginal zone 1. The inclination of the round profiled shaft, at an angle relative to the radial direction, results in a pointed area as the cutting line. The outside surface 14' is again situated on a surface of the roller so that it is very easy to grind when the cutting member 3 rotates and a grinding stone is axially moved to and fro. As far as all the other elements in FIG. 11 are concerned, the reference numerals denote the same parts as are in FIGS. 8 through 10.

The afore-described solutions of corrugation in combination with grinding provisions may be expediently applied for wide angles of inclination $\alpha$ of continuous cutting blades, as they are used, for instance, in spindle-type mowers.

Figure 12:
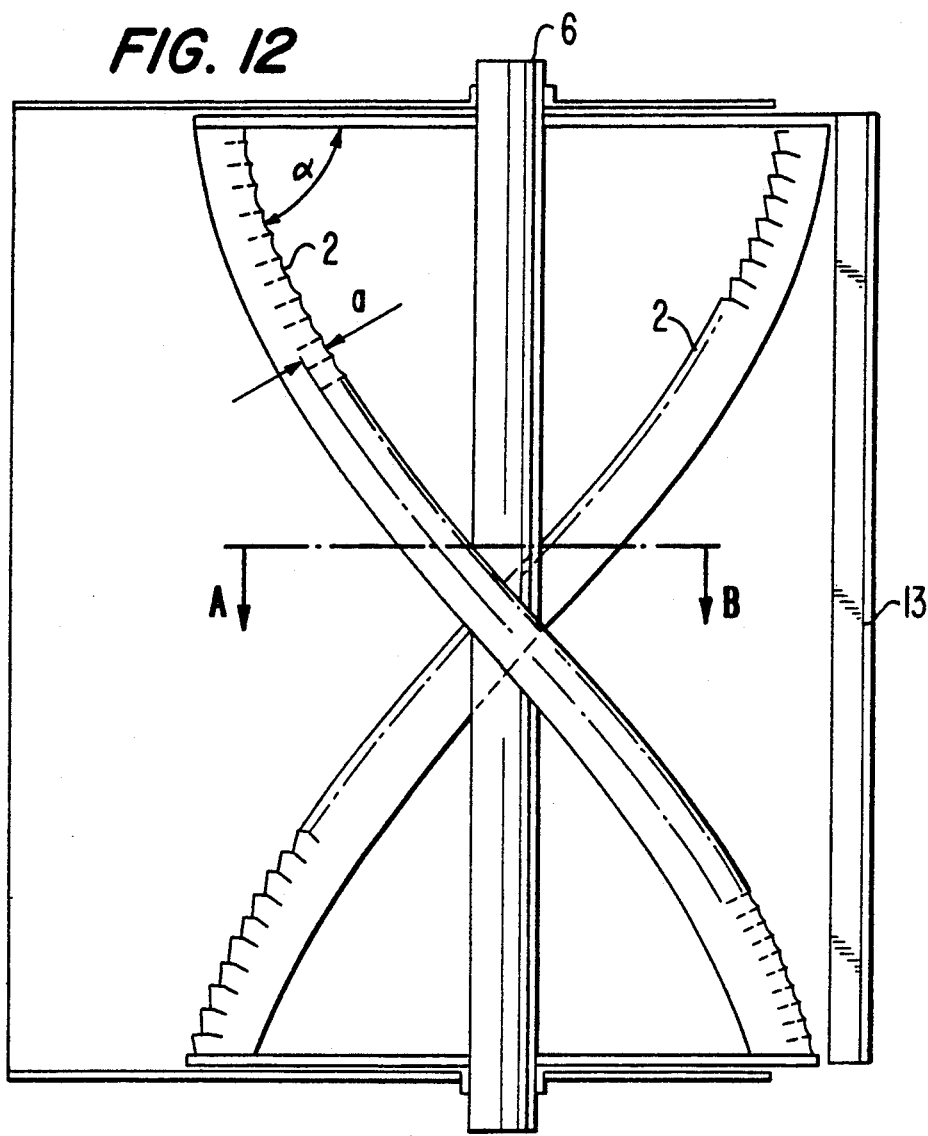
FIGS. 12 to 14 illustrate an embodiment with continuous cutting blades.

FIG. 12 is a side view of a spindle-type mower with continuous cutting blades 2 which are disposed on a drum having an axis 6.

Figure 14:
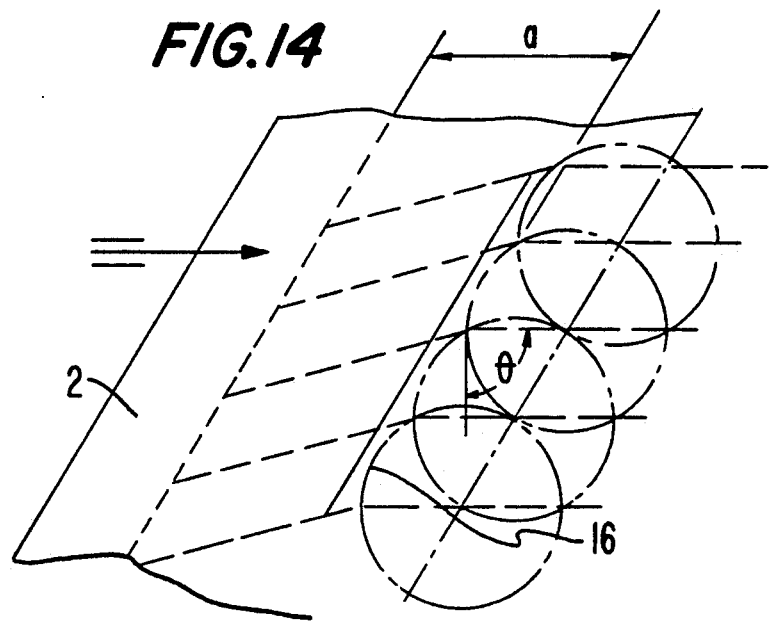
Figure 13:
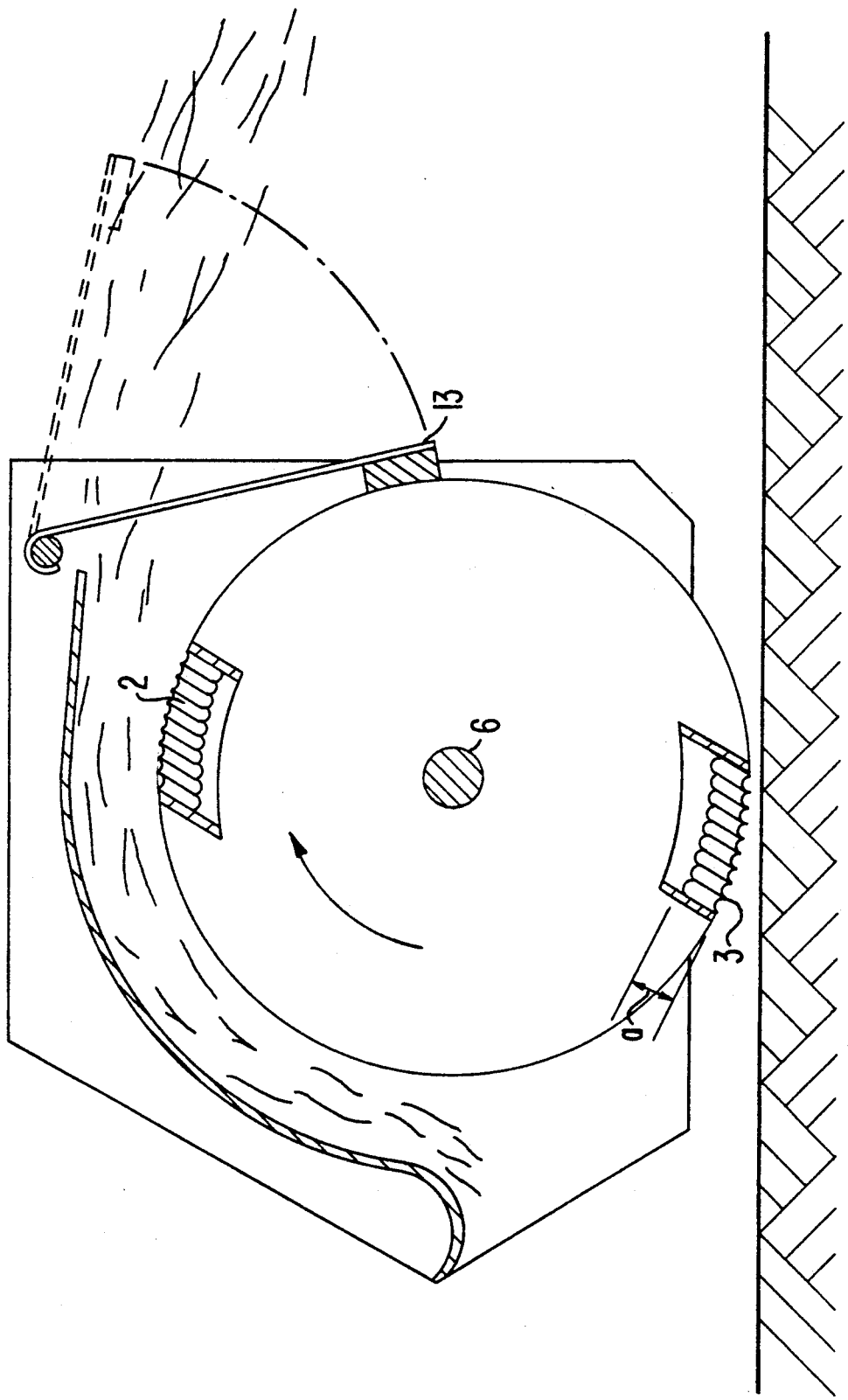

FIG. 13 is a sectional view taken at A-B in FIG. 12. In the embodiment shown in FIG. 14, the sequence of the rounded sections 16 of the profile of zone (a) of the cutting bar 3 is so selected with an angle of inclination $\alpha$, that it terminates at an angle $\phi \geq 90°$ relative to the direction of travel. The mowed material is laterally pressed out from the rounded section 16 so that no stalk and blade material will adhere to the rounded portions.

In the following, some embodiments will be described wherein the helix is of a particular inventive design. This embodiment may be applied both in roller-type mowers with a plurality of isolated and overlapping cutting members as well as in mowers with a continuous cutting blade.

Figure 15:
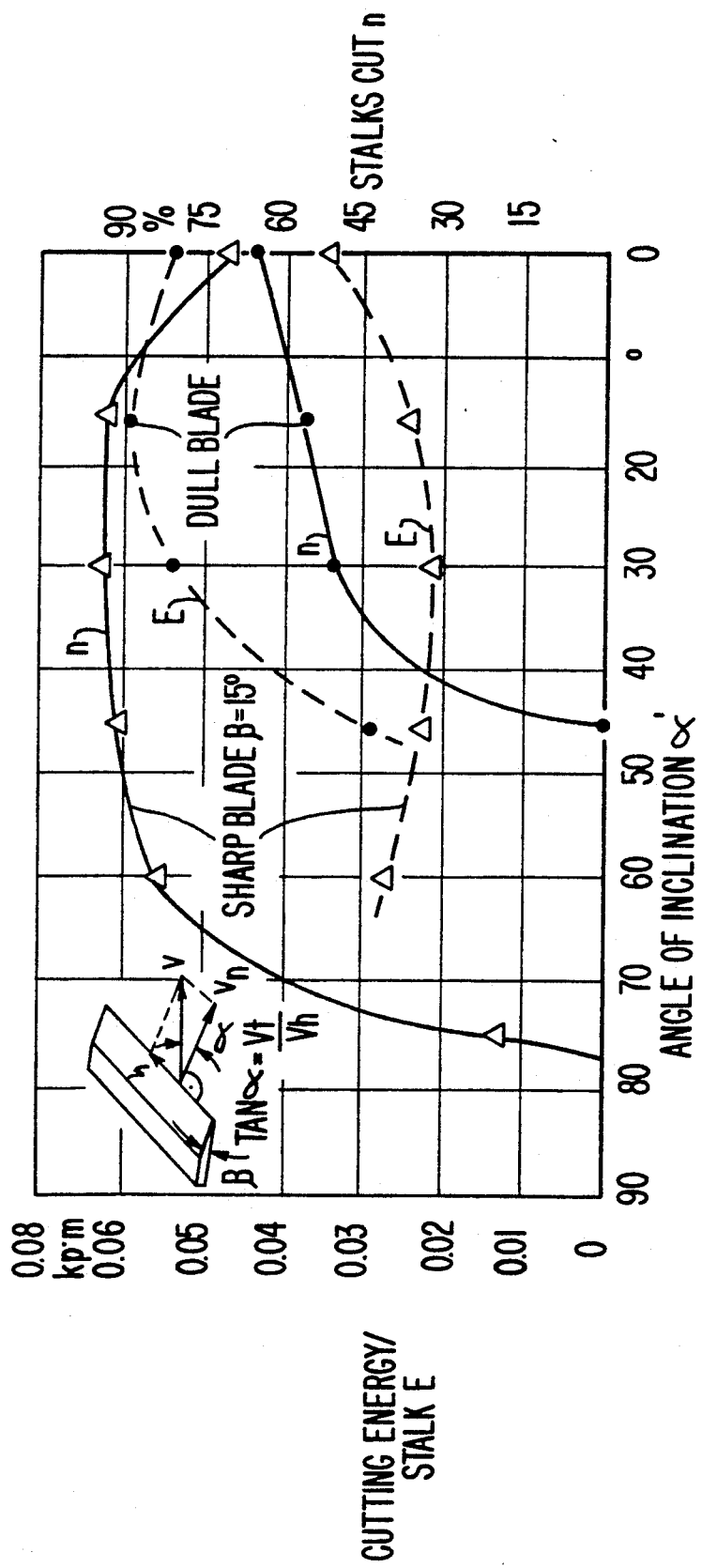
FIG. 15 is a diagram of the interrelationship between the cutting energy or the "cutting result" and the helical inclination $\alpha$.

FIG. 15 shows the cutting energy (broken line) required for cutting with the known mowing systems, or the percentage of the cut shafts or stalks (uninterrupted line) as a function of the angle of inclination $\alpha$ of the cutting blade for a sharp blade and a blunt blade (according to Feller). FIG. 15 illustrates that with a blunt blade a rather strong decrease of the quality of cut will arise at a comparatively small angle of inclination in the range of 30°.

FIG. 15 moreover illustrates that with a growing angle of inclination $\alpha$ the required cutting energy initially decreases, which means that an increasing dragging cut will be brought about, even though at a reduced power consumption.

Figure 16:
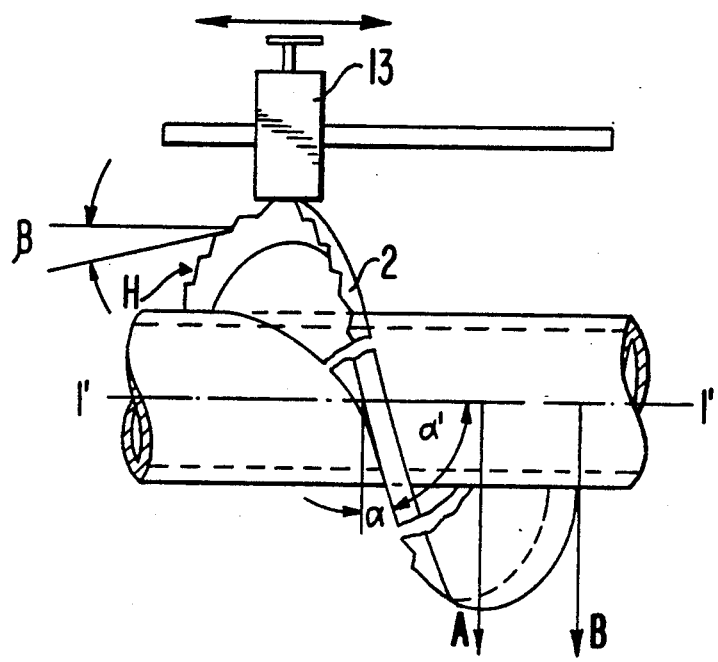
FIG. 16 shows the parameters used in blade design.
Figure 16A:
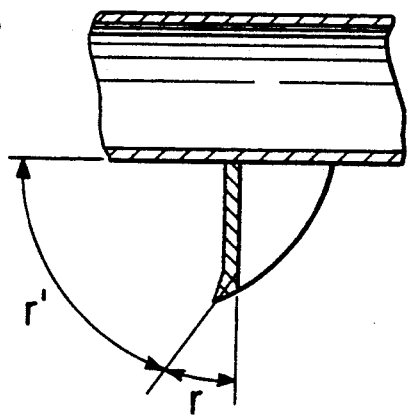
FIG. 16a is a section of the blade of FIG. 16 taken along the line A-B.

These unfavorable interrelationships are avoided by the present invention. FIG. 16 shows, in a way similar to FIG. 8, the parameters used, i.e. the inclination angle $\alpha$ of the helix 2, the angle of inclination $\beta$ of the tooth flank effective in cutting, and the angle of inclination $\Gamma'$ of the cutting blade relative to the axis 1' of the drum or roller 1 or the angle $\Gamma = (90° - \Gamma')$ (FIG. 16a Section A-B).

Figure 17:
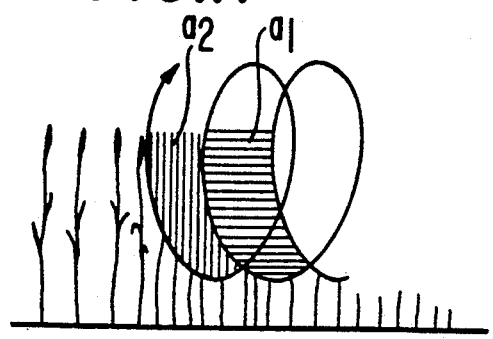
FIG. 17 illustrates the "mowing path" achieved.

The FIG. 17, which has already been discussed, shows that the upright stalks and blades will be beaten off in comma-shaped sections $a_1; a_2; \ldots$ in congruence with the mowing path which becomes more and more cycloidal as a function of the speed of travel.

Figure 18:
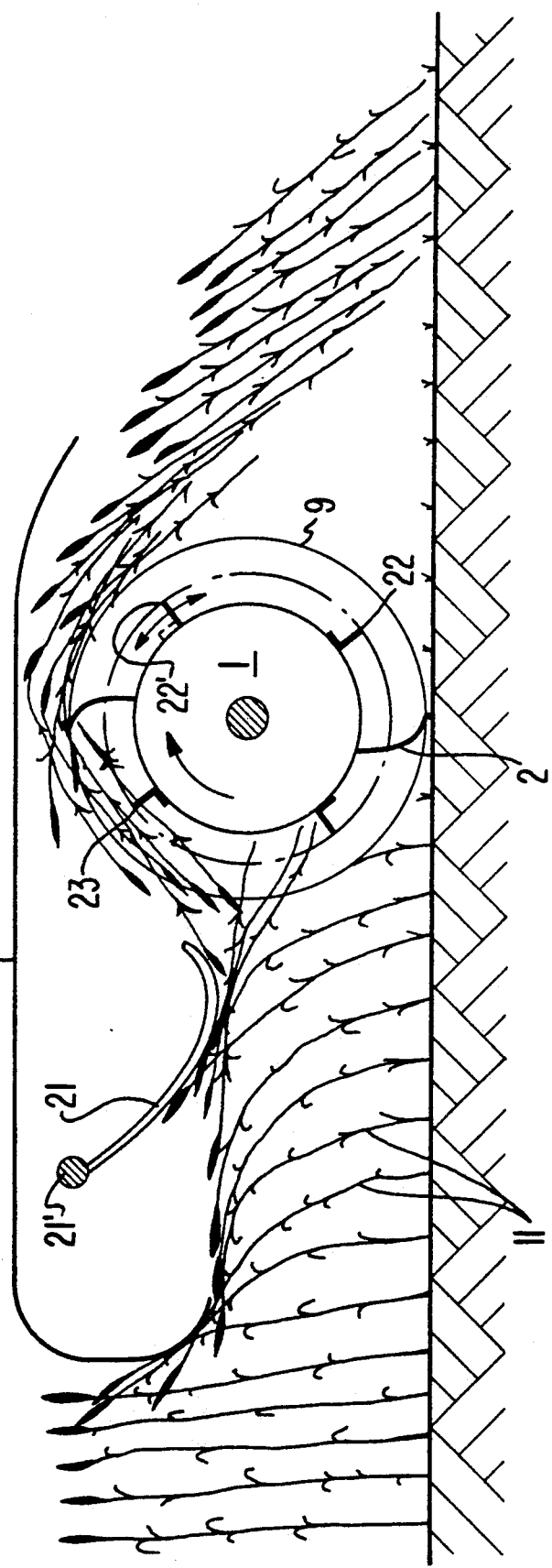
FIG. 18 represents another embodiment of the invention.

FIG. 18 shows another embodiment of the present invention, i.e. a helical mower having a cutting helix 1, a hood 20 and a cloth 21 disposed immediately ahead of the helix 1 and resting slightly on the stalks by bending the blades 11 thereof forwardly. The cloth 21 is fixed to a pivoted cylinder 21' so that the "free" length of cloth may be adjusted.

The bent blades and stalks come into the cutting circle 9 of the mowing helix 1 only in the region near the ground so that their heads will not be beaten off from above. This disposition, closely to the cutting roller, prevents the mowed material from being thrown against the material still upright and to be cut and causes the mowed material to be ejected upwardly and rearwardly. The driving or catch bars 22 promote such a rapid removal of the mowed material from the cutting zone.

Whenever the cut material is to be treated mechanically, toothed bars 23 are attached. Optionally provisions are made for tilting of the bars 22' up to attachment to the center body as to dose the intensity of transport or treatment.

Figure 19:
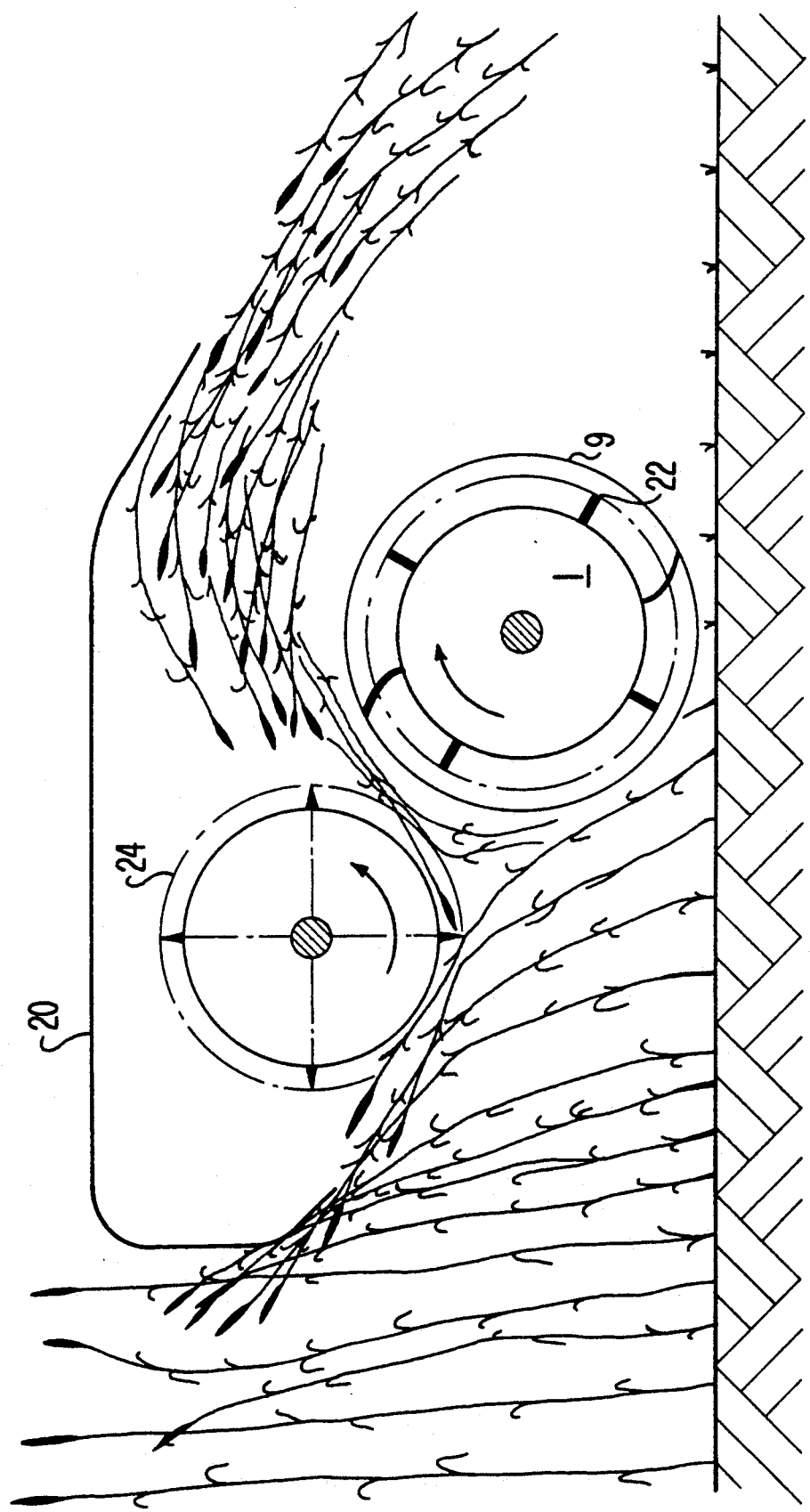
FIG. 19 shows a modification of the embodiment of FIG. 18.

FIG. 19 shows a modification of the embodiment of FIG. 18, wherein the cloth is replaced by a driven cylinder 24 which actively removes the cut material from the cutting zone.

Figure 20:
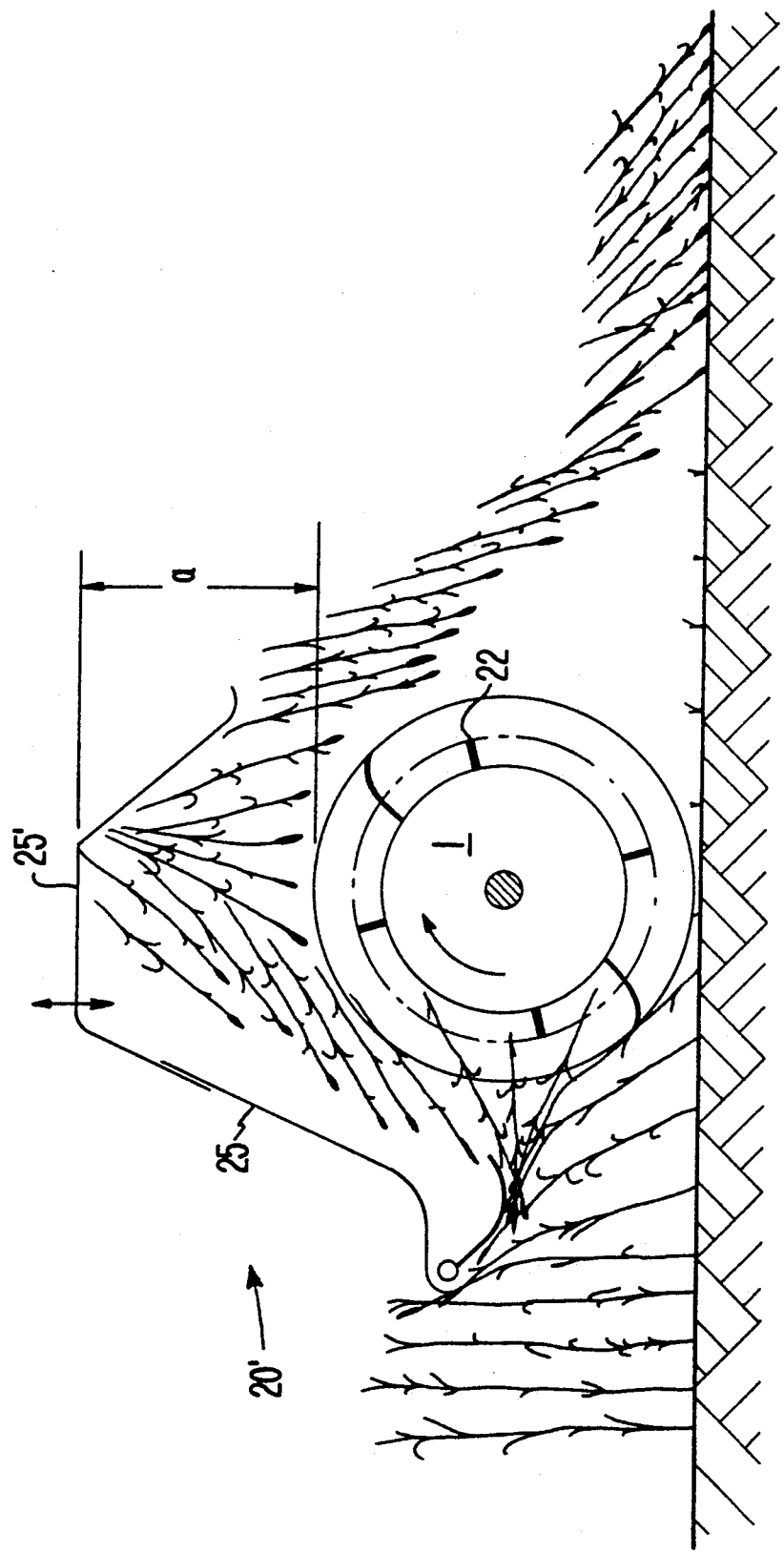
FIG. 20 illustrates another modification of FIG. 18.

FIG. 20 illustrates another modification of the embodiment according to FIG. 18, wherein a rising hood 20' is disposed above the helical mower. The front wall 25, which rises obliquely and rearwardly, is arranged essentially ahead of the helical mower so that the mowed stalk and blade material will be upwardly ejected nearly vertically. The material hits the upper bottom trough 25', which has a variable spacing (a) from the helical mower. The set height (a) may be made somewhat less than the length of the stalks or blades so that the upper ends of the stalks and blades will be moved rearwardly by the mowing drum 1. Due to the downwardly projecting rear wall of the hood 20' a turning effect of the mowed material is achieved. The ends of the stalks and blades are then substantially at the top of the swath. Depending on the height set an irregular deposition or a deposition with the ears upward may also be achieved.

Figure 21:
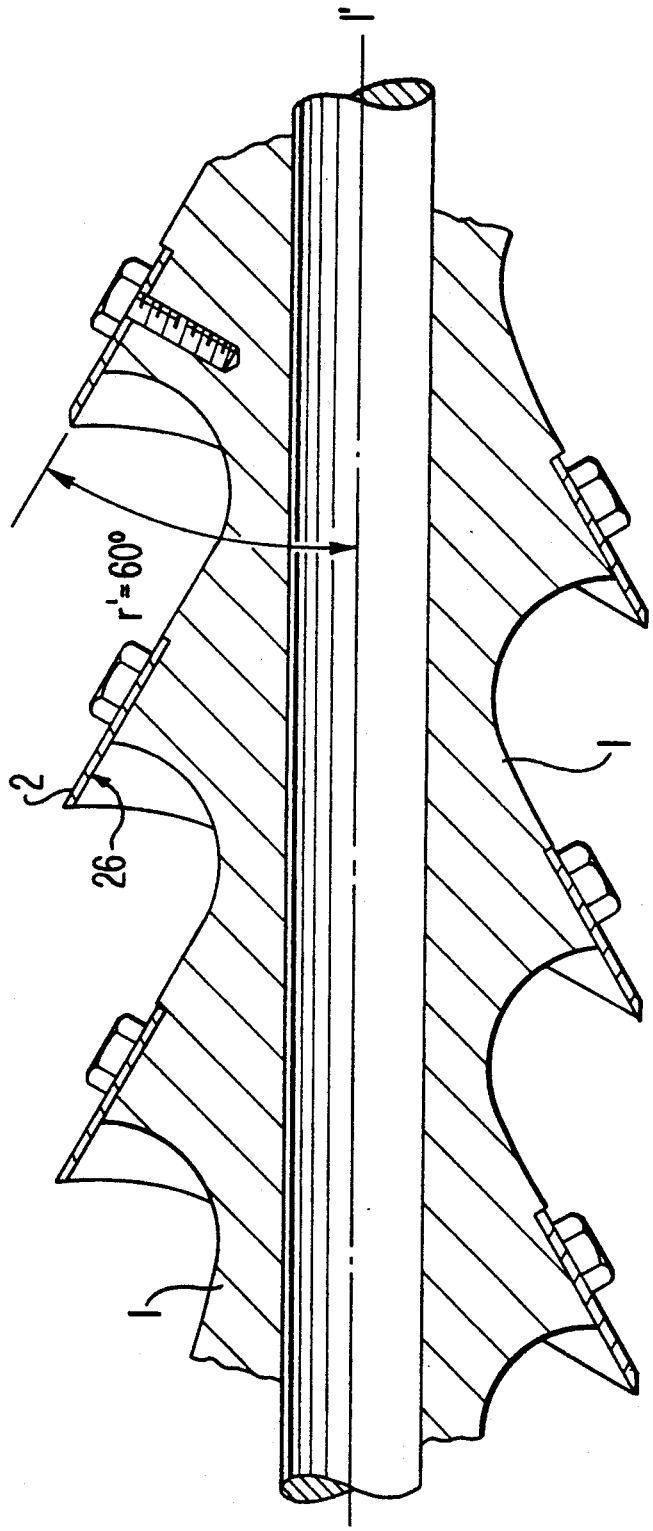
FIGS. 21 to 23 show various blade embodiments of another type of mowing rotor.

FIG. 21 shows the rotor of a helical mower wherein a thin continuous cutting blade 2 is screwed onto a helical supporting body 1, which blade encloses with the axis 1' an angle $\Gamma' \approx 60°$ so that soil clots and residues of the stalks and blades may be removed outwardly in the zone 26. Otherwise the deposition of soil clots and particles of stalks and blades would finally result in such an accumulation that the cutting edge will no longer have sufficient free space for cutting and cutting would thus become impossible.

Figure 22:
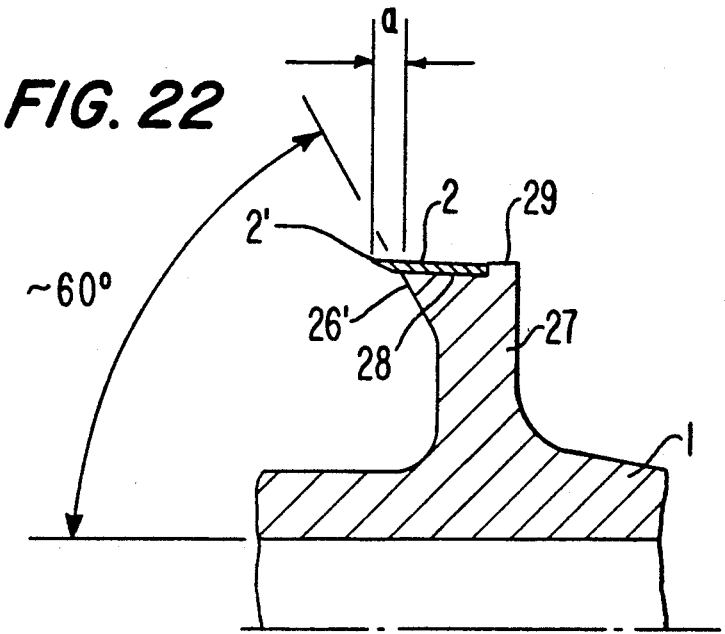
Figure 23:
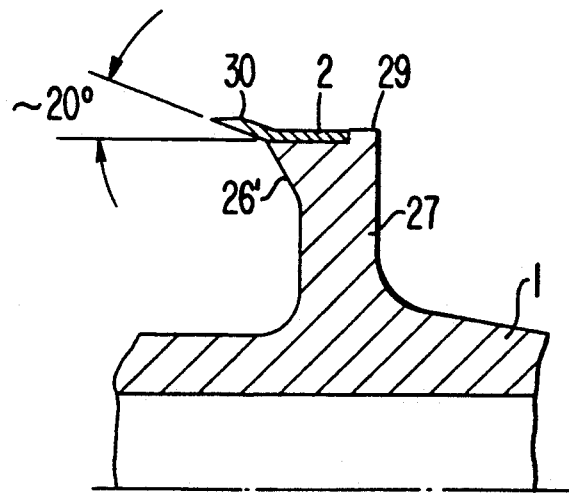

FIGS. 22 and 23 show further embodiments of the rotor illustrated in FIG. 21. Here the supporting body 1 is provided with a helical bar 27 which carries the (cutting) band 2 on a cylindrical surface 28. This band, when unwound, forms a straight strip (FIG. 22). The band 2 rests against the collar 29 of the bar 27 so that it may absorb an axial component of the cutting force.

The flank 26' of the bar 27, which faces the cutting side, is in its turn inclined relative to the axis 1' by approximately 60° so that soil clots or plant residues may not accumulate. The inclined flank 26', which is slightly staggered inwardly relative to the cutting edge 2' of the band 2, prevents the stalks and blades from being pressed aside by the flank 26' when they are cut. The projection (a) of the cutting band 2 must be matched with the diameter of the stalks and blades to be cut and it should exceed the diameter of the shafts so that the stalk or blade will not slip onto the flank 26' and be pushed aside when it is cut.

FIG. 23 shows a toothed blade on the band 2. The flank 26' of the bar 27 opens at the root of the teeth 28 The teeth 28 are pitched slightly outwardly so that they may be ground in an s-curve along the line. The inclination of the teeth may already be achieved with the loose straightened band. It will become evident that a "fully resting" superposition of the band on the bar will be possible even with small teeth when compared to the diameter of the helix.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A roller-type mower, comprising:
   a rotatable drum provided with a plurality of spaced separate cutting members on its surface, wherein
   said cutting members are adjusted to rotate at a desired speed for cutting;
   each cutting member is arranged inclined or helical, and pitched at an angle relative to an axis of rotation of the drum; and
   the mutually spaced cutting members overlap each other in a direction of travel of the mower wherein the cutting members are inclined at an angle of less than 30°;
   an angle of inclination of flanks of the cutting blade is wider than 20°; and
   an angle of inclination of the cutting blade, relative to a rotary axis of the mower, exceeds 60°.

2. A mower according to claim 1, wherein
   each cutting member comprises a toothed, corrugated undulated cutting blade;
   wherein said blade is designed with a continuous helix which rotates at a speed required for free cutting.

3. A mower according to claim 1, wherein marginal zones of the cutting member enclose an angle with the axis of rotation of the mower.

4. A mower according to claim 2, wherein marginal zones of the cutting member enclose an angle with the axis of rotation of the mower.

5. A mower according to claim 1, wherein the cutting members are suspended to oscillate.

6. A mower according to claim 2, wherein the cutting members are suspended to oscillate.

7. A mower according to claim 3, wherein the cutting members are suspended to oscillate.

8. A mower according to claim 1, wherein the cutting members are disks with rim zones that are cambered and which are spaced from another; and
   wherein the disks are disposed on a shaft inclined relative to the direction of travel of the mower to an extent that the mowing zones of the individual disks will overlap each other in the direction of travel.

9. A mower according to claim 2, wherein the cutting members are disks with rim zones that are cambered and which are spaced from another; and
   wherein the disks are disposed on a shaft inclined relative to the direction of travel of the mower to an extent that the mowing zones of the individual disks will overlap each other in the direction of travel.

10. A mower according to claim 2, wherein the mower is supported by a guide bar with a tip that reaches up to the center of the roller; and
    wherein there is a gap provided underneath the roller and between the roller and the tip of the guide bar.

11. A mower according to claim 3, wherein a toothed profile is provided on an inner surface of the marginal zone of said cutting members; and
    wherein said inner surface is inclined relative to the axis of rotation of the mower.

12. A mower according to claim 11, wherein teeth of the tooth profile extend radially relative to the axis of rotation.

13. A mower according to claim 11, wherein the tooth profile is forwardly inclined at an angle relative to the direction of rotation, 14. A mower according to claim 12, wherein a cutting line of the teeth of the tooth profile is inclined relative to the axis of rotation.

15. A mower according to claim 13, wherein a cutting line of the teeth of the tooth profile is inclined relative to the axis of rotation.

16. A mower according to claim 11, wherein the teeth have a peripheral residual gauge.

17. A mower according to claim 11, wherein the marginal zone is inclined relative to the axis of rotation and is provided with a profile presenting a cross-sectional area in the form of a circular segment on an inner face.

18. A mower according to claim 17, wherein rounded portions of the profile terminate at an angle $\geq 90°$ relative to a direction of movement of the mower.

19. A mower according to claim 11, wherein the inner surface inclined relative to the axis of rotation is treated to be wear-resistant.

20. A mower according to claim 1, wherein the mower has a cloth means that slightly rests on and bends upright stalks in the direction of travel of said mower; and
    wherein said cloth means is located in the zone directly ahead of the mowing rotor.

21. A mower according to claim 20, wherein said cloth means is pivotably attached to a shaft.

22. A mower according to claim 1, wherein a driven roller is disposed immediately ahead of the drum in the driving direction of the mower.

23. A mower according to claim 1, wherein said drum carries bars which extend axially between the cutting members.

24. A mower according to claim 2, wherein a hood is disposed above the drum and has a front wall which extends obliquely upwardly and is substantially disposed ahead of the mowing rotor and also has a portion which is adjustable in height and which carries a rear wall that projects downwardly.

25. A mower according to claim 1, wherein a cutting band means is fastened as a separate strip on a helical supporting body to provide the cutting member.

26. A mower according to claim 2, wherein a cutting band means is fastened as a separate strip on a helical supporting body to provide the cutting member.

27. A mower according to claim 25, wherein the drum is provided with a helical bar with a cylindrical surface as a rest for the cutting band.

28. A mower according to claim 26, wherein the drum is provided with a helical bar with a cylindrical surface as a rest for the cutting band.

29. A mower according to claim 27, wherein a flank of said helical bar faces the material to be cut at an angle with the rotating axis that is smaller than 90°.

30. A mower according to claim 28, wherein a flank of said helical bar faces the material to be cut at an angle with the rotating axis that is smaller than 90°.

31. A mower according to claim 27, wherein the band is toothed and rests on a cylindrical supporting surface of said helical bar such that the flank of said bar opens at the root of the teeth.

32. A mower according to claim 28, wherein the band is toothed and rests on a cylindrical supporting surface of said helical bar such that the flank of said bar opens at the root of the teeth.

33. A mower according to claim 31, wherein the teeth are outwardly bevelled relative to the cylindrical surface, and are ground by a stone movable to and fro as the drum rotates.

34. A mower according to claim 27, wherein said cutting band rests against a collar of said bar and is enclosed by the latter.

35. A mower according to claim 1, wherein a grinding bar resiliently rests on the cutting member while the drum rotates.

* * * * *